United States Patent
Araki et al.

(10) Patent No.: US 10,222,994 B2
(45) Date of Patent: Mar. 5, 2019

(54) STORING SELECTED DATA IN A STUB FILE IN A HIERARCHICAL STORAGE MANAGEMENT SYSTEM

(71) Applicant: International Business Machines Corporation, Armonk, NY (US)

(72) Inventors: Hiroshi Araki, Yokohama (JP); Shinobu Fujihara, Yamato (JP); Tohru Hasegawa, Tokyo (JP); Takeshi Ishimoto, Kawasaki (JP); Hiroshi Itagaki, Yokohama (JP); Hiroyuki Miyoshi, Kawasaki (JP); Yutaka Oishi, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/207,553

(22) Filed: Jul. 12, 2016

(65) Prior Publication Data
US 2018/0018089 A1    Jan. 18, 2018

(51) Int. Cl.
G06F 3/06    (2006.01)

(52) U.S. Cl.
CPC .............. *G06F 3/061* (2013.01); *G06F 3/065* (2013.01); *G06F 3/0643* (2013.01); *G06F 3/0647* (2013.01); *G06F 3/0683* (2013.01)

(58) Field of Classification Search
CPC ...... G06F 3/061; G06F 3/0643; G06F 3/0647; G06F 3/065; G06F 3/0683; G06F 3/0685
USPC ........................................................ 711/117
See application file for complete search history.

(56) References Cited

U.S. PATENT DOCUMENTS

| 5,991,753 | A  | * | 11/1999 | Wilde  ............... G06F 17/30067 |
| 7,107,298 | B2 | * | 9/2006  | Prahlad ............ G06F 17/30067 |
|           |    |   |         | 707/640 |
| 7,165,059 | B1 |   | 1/2007  | Shah et al. |
| 8,055,724 | B2 |   | 11/2011 | Amegadzie et al. |
| 8,209,498 | B2 |   | 6/2012  | Takata et al. |
| 8,856,073 | B2 |   | 10/2014 | Matsuzawa |
| 8,935,495 | B2 |   | 1/2015  | Bender et al. |
| 9,213,721 | B1 | * | 12/2015 | Faibish ............. G06F 17/30221 |
| 2004/0083202 | A1 | * | 4/2004 | Mu ....................... G06F 3/0622 |

(Continued)

FOREIGN PATENT DOCUMENTS

JP    2007073039 A    3/2007

OTHER PUBLICATIONS

J. Srivastava, J. S. E. Tan and V. Y. Lum, "TBSAM: an access method for efficient processing of statistical queries," in IEEE Transactions on Knowledge and Data Engineering, vol. 1, No. 4, pp. 414-423, Dec 1989. doi: 10.1109/69.43417.*

(Continued)

*Primary Examiner* — Reginald G Bragdon
*Assistant Examiner* — Aaron D Ho
(74) *Attorney, Agent, or Firm* — Edward J. Wixted, III (57) ABSTRACT

According to an aspect of the present invention, there is a method, computer program product and/or system for storing data that performs the following operations (not necessarily in the following order): (i) receiving a request to migrate a data file from primary storage to secondary storage; (ii) invoking a primary data extraction function, registered by a user, to determine primary data for the data file; and (iii) inserting the primary data into a stub file.

5 Claims, 7 Drawing Sheets

(56) References Cited

U.S. PATENT DOCUMENTS

| | | | |
|---|---|---|---|
| 2007/0033340 A1* | 2/2007 | Tulskie | G06F 3/0605 |
| | | | 711/108 |
| 2011/0246429 A1 | 10/2011 | Prahlad et al. | |
| 2013/0262394 A1* | 10/2013 | Kumarasamy | G06F 17/30073 |
| | | | 707/673 |
| 2014/0122547 A1 | 5/2014 | Agetsuma et al. | |
| 2017/0109053 A1 | 4/2017 | Bromley et al. | |

OTHER PUBLICATIONS

IBM, "Stub File Size", Version 6.4.0, May 11, 2016, 1 page, <https://www.ibm.com/support/knowledgecenter/SSGSG7_6.4.0/com.ibm.itsm.hsmul.doc/c_mig_stub_size.html>.

* cited by examiner

STORING SELECTED DATA IN A STUB FILE IN A HIERARCHICAL STORAGE MANAGEMENT SYSTEM

BACKGROUND OF THE INVENTION

The present invention relates generally to the field of hierarchical storage management systems, and more specifically to reducing the frequency of data recalls from a slower storage level to a faster storage level.

The Wikipedia entry for "Hierarchical storage management", as of May 24, 2016, states as follows: "Hierarchical storage management (HSM) is a data storage technique, which automatically moves data between high-cost [primary] and low-cost [secondary] storage media. HSM systems exist because high-speed storage devices, such as hard disk drive arrays, are more expensive (per byte stored) than slower devices, such as optical discs and magnetic tape drives . . . . HSM systems store the bulk of [an] enterprise's data on slower devices, and then copy data to faster disk drives when needed. In effect, HSM turns the fast disk drives into caches for the slower mass storage devices. The HSM system monitors the way data is used and makes best guesses as to which data can safely be moved to slower devices and which data should stay on the fast devices."

SUMMARY

According to an aspect of the present invention, there is a method, computer program product and/or system for storing data that performs the following operations (not necessarily in the following order): (i) receiving a request to migrate a data file from primary storage to secondary storage; (ii) invoking a primary data extraction function, registered by a user, to determine primary data for the data file; and (iii) inserting the primary data into a stub file. Further to item (ii) above, the portion of a data file that is considered to be primary data may be determined by a developer of the primary data extraction function, based on what data is of particular interest to a user.

According to a further aspect of the present invention, there is a method, computer program product and/or system for retrieving data that performs the following operations (not necessarily in the following order): (i) receiving, from a requester, a request to access primary data for a data file; (ii) determining if the primary data is in a stub file corresponding to the data file; (iii) on condition that the primary data is in the stub file, retrieving the primary data from the stub file; and (iv) providing the primary data to the requester.

According to a further aspect of the present invention, there is a method, computer program product and/or system for accessing data that performs the following operations (not necessarily in the following order): (i) determining whether a data file has been migrated to secondary storage; (ii) retrieving primary data corresponding to the data file from primary storage responsive to determining that the data file has been migrated to secondary storage; and (iii) receiving the primary data.

DETAILED DESCRIPTION

Some conventional enterprise storage systems support hierarchical storage management (HSM). HSM is a method to lower the storage cost while maximizing the input/output (I/O) performance. In a conventional HSM system, multiple tiers of storage media are installed in the storage system. For example, the first tier can be a high-cost, fast storage media (such as solid-state drive or disk) while the second tier can be a low-cost storage media (such as tape). For convenience as used herein, a faster tier will sometimes be referred to as a disk (or primary storage) and a relatively slower storage tier will sometimes be referred to as a tape (or secondary storage). However, it is to be understood that other types of storage devices, now known, or to be developed in the future, may be involved. It is to be further understood that more than two storage tiers may be involved in some embodiments of the present invention and that embodiments may be applicable to any of the various storage tiers.

HSM automatically migrates a data file from disk to tape based on policies such as access frequency and/or the file size. When a file is migrated to tape (secondary storage), a stub file, which includes certain metadata relative to the file, is created on the disk (primary storage) and the actual file data is migrated to tape. The migration is transparent to users. The file appears (from a user's perspective) to exist in the storage system the same way after the migration as it appeared before. If an application tries to read a migrated file, HSM recalls the data from the tape and presents it to the user.

A recall is an "expensive" operation, in that it may require HSM to find the relevant tape cartridge, load the cartridge into an available tape drive, forward the tape to the requested data location, and read the data. Moreover, the number of tape drives in a storage system is typically limited so if many recalls are requested at once, it may create a bottleneck and consume a significant amount of time before the data can be read. From a performance perspective, is it desirable to avoid recalls as much as possible.

To avoid recalls, consideration is given as to which files are migrated to tape, and when those files are migrated. This is typically controlled by a migration policy. However, in general, future data access needs are difficult to accurately predict. Some HSM systems use a "least recently used" (LRU) policy. An LRU policy selects files in order of access-time, and migrates to tape those files having the oldest access time. If an application needs to access a file that has been migrated, a recall is triggered.

Recently, "big data" analysis and "internet of things" (IoT) are emerging, in which, for example, a huge amount of sensor data or log data are gathered in a central location (for example, an HSM system). Typical examples of how such systems analyze data include: (i) monitoring data (such as system logs, network traffic, and/or sensor data) in real time, to detect abnormal conditions or errors; and/or (ii) analyze the data to help optimize the corresponding environment.

Data are typically auto-generated by various sensors and/or servers. A monitoring or analytic application processes the data. For storage of such big data, such as an IoT solution, use of HSM (including migrating data to tape media) can significantly reduce the overall storage cost. However, to realize the benefit of reduced cost, occurrences of recalls should be minimized.

Some embodiments of the present invention introduce a new usage of the HSM stub files, to minimize occurrences of recalls.

In some embodiments of the present invention, a new migration policy includes the following operations in conjunction with migrating a data file to tape: (i) an application calculates and/or selects a subset of the data in the data file, the subset to be preserved on disk; (ii) preserves the selected subset of the data in the corresponding stub file; and/or (iii) migrates the data file to tape in a conventional fashion.

When the data is to be recalled, the stub file is examined to determine if it already includes the subset of data that is needed. If the required data is in the stub file, that data is returned to the application and a recall of the whole data file is avoided. In this way, the system can avoid hitting recalls as much as possible while moving huge amounts of raw data to tape.

The present invention will now be described in detail with reference to the Figures.

Figure 1:
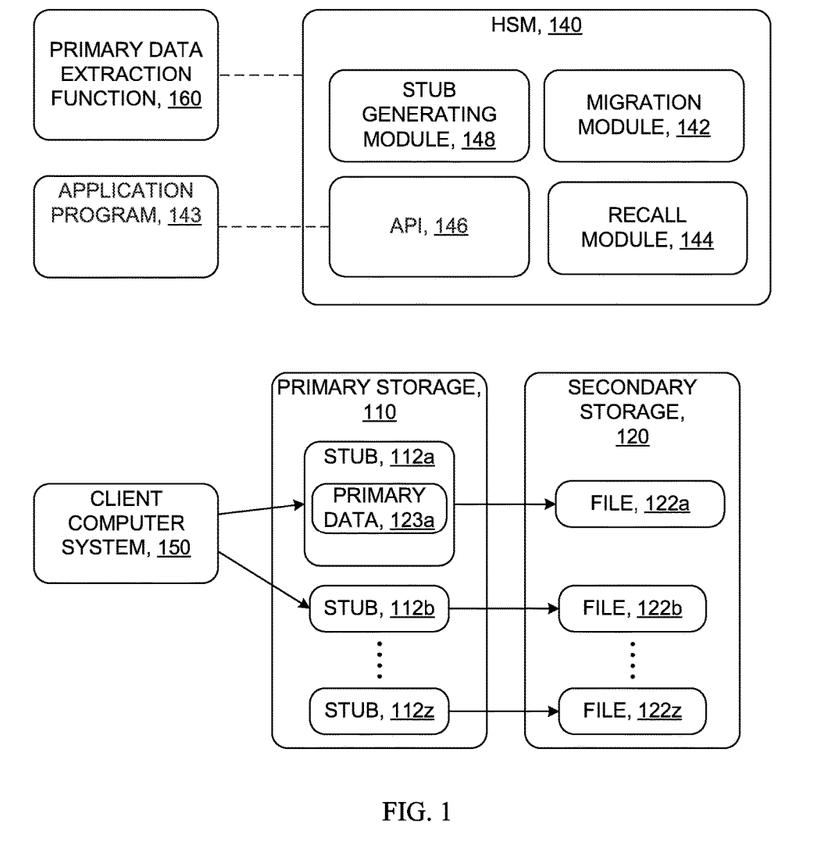
FIG. 1 is a block diagram depicting one example of a hierarchal storage management system wherein at least one embodiment of the claimed invention may be utilized.

The embodiments disclosed herein improve the responsiveness of recall operations in storage systems, such as hierarchical storage management (HSM) systems, that migrate data to secondary storage devices. For example, FIG. 1 is a block diagram depicting one example of an HSM system 140 wherein at least one embodiment of the claimed invention may be utilized. As depicted, HSM system 140 includes stub generating module 148, migration module 142, and recall module 144. In some embodiments of the present invention, application program 143 interfaces with HSM 140 via application programming interface 146 (API 146).

Operationally coupled with HSM system 140 are various computing resources, including one or more primary storage devices 110, one or more secondary storage devices 120 and one or more client computer systems 150. Secondary storage 120 stores multiple data files including files 122a, 122b, etc. Primary storage 110 includes multiple stub files, including stub files 112a, 112b, etc., respectively corresponding to data files 122a, 122b, etc. Further, a user-defined primary data extraction function 160 is invoked in coordination with operation of stub generating module 148, as will be explained below with reference to FIG. 2.

HSM system 140 enables: (i) migration operations that transfer data (for example, data files, log files, image, video and audio files, etc.) from the primary storage device 110 to secondary storage 120; and/or (ii) recall operations that transfer data from the secondary storage 120 to primary storage devices 110.

Primary storage devices 110 typically provides faster access to data stored thereon than secondary storage 120. However, secondary storage 120 typically can store significantly more data than primary storage devices 110.

HSM system 140 may track the status of files 122 that are stored on secondary storage 120 on behalf of client computer systems 150. Secondary storage 120 may enable clients 150 such as application servers to use HSM system 140 by accessing primary storage devices 110 in a conventional manner. For example, files such as file 122a, 122b, etc., may be represented on the primary storage devices 110 as file stubs, such as stub 112a, 112b, etc. Each stub points to a corresponding file on secondary storage.

When a client 150 attempts to access a file, for example file 122a, the access attempt locates the corresponding stub file 112a. The stub file includes a flag that identifies it as a stub file. On detecting that the file accessed is a stub file, HSM system 140 issues a recall operation (for example, via recall module 144) that pulls the corresponding data file 122a from secondary storage, into a temporary local file (not shown) in primary storage device 110. The data may be modified, by client 150, on primary storage device 110 and migrated back to secondary storage 120 (for example, via migration module 142) as directed by the hierarchical storage manager 140. Alternatively, a LRU policy may determine that data file 122a should remain on primary storage (for example due to its recent access history).

In the embodiment of FIG. 1, each primary storage device 110 is a hard disk drive (HDD), and secondary storage 120 is a linear tape file system (LTFS). The LTFS enables applications (not shown) executing on client computer systems 150 to access files 122 using conventional system calls (for example, hard disk drive system calls). However, if an application for an HDD is actually made to operate using the LTFS directly without being modified, accessing a file may take more time than expected and the HDD system calls may timeout rendering the application unable to access the file. To prevent such a situation, HSM system 140 includes the primary storage devices 110 and the LTFS is used as secondary storage.

Figure 2:
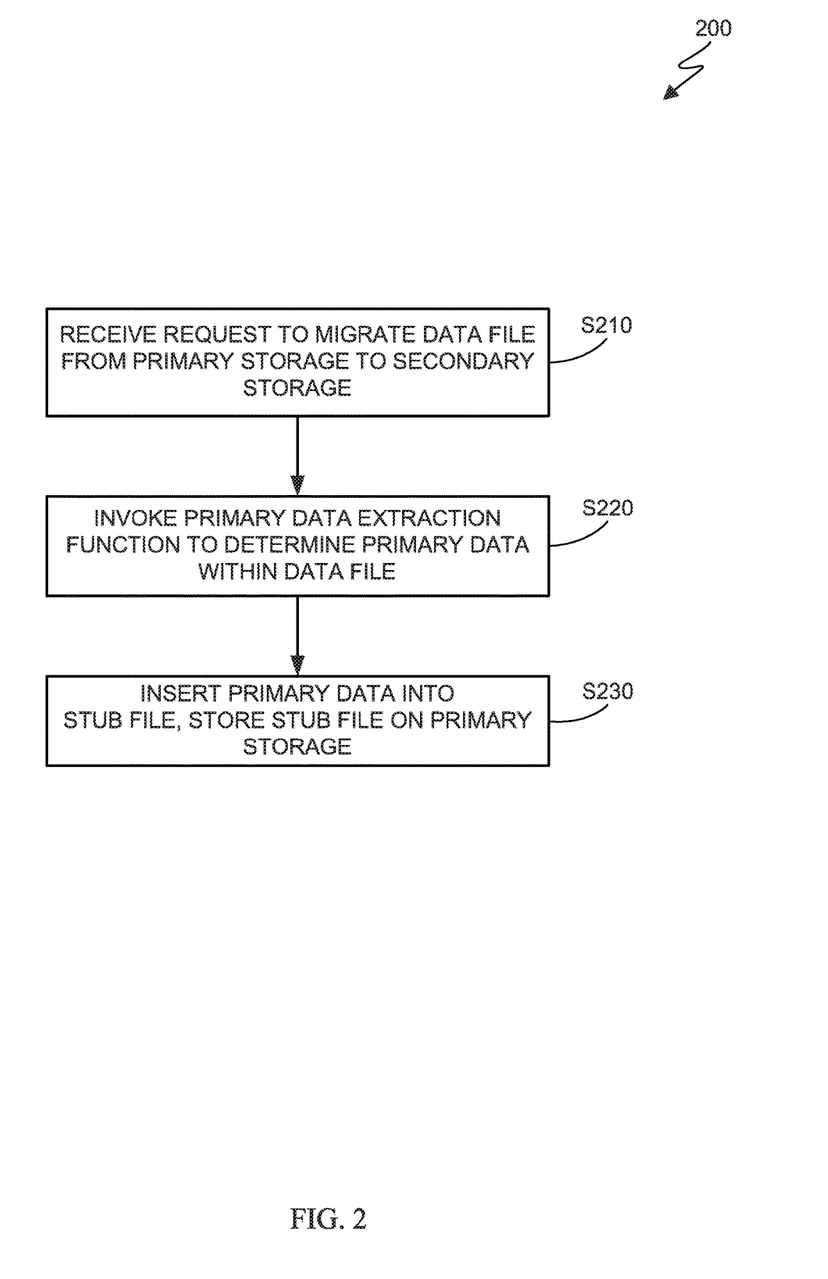
FIG. 2 is a flowchart depicting one example of a data migration method in accordance with at least one embodiment of the present invention.

As shown in FIG. 2, method 200 is a flowchart depicting one example of a data migration method in accordance with at least one embodiment of the present invention. Processing begins with operation S210 where migration module 142 of HSM system 140 (see FIG. 1) issues a request to migrate a data file, for example file 122a, from primary storage (disk) to secondary storage (tape).

Processing proceeds at operation S220 where HSM system 140 invokes a user-defined primary data extraction function 160 (see FIG. 1). Primary data extraction function 160 determines a subset of the data in file 122a that is considered to be primary data.

In one embodiment, a data file is a system log file that includes routine records and error records related to system activity. In this embodiment, primary data (useful data) in a system log file may be considered to be each error record and a pre-determined number of records immediately preceding and following each error record.

There may be defined any number of primary data extraction functions 160. A given data extraction function is designed to work with: (i) a corresponding type of data file; (ii) particular data files; and/or (iii) data files in a specified directory or group of directories. For example, computer system log files may be processed by a first data extraction function, while user (and/or client computer) statistics gathered by a web server may be processed by a second data extraction function, and database log files may be processed by a third data extraction function specific to a particular database.

Processing proceeds at operation S230, where stub generating module 148: (i) generates a stub file corresponding to the data file (file 122a in this example); (ii) inserts the useful data (determined in operation S220 as described above) into stub file 112a; and/or (iii) stores the stub file on primary storage 110.

Data migration proceeds in the conventional manner. That is, the data file (file 122a in this example) is migrated to secondary storage 120 and is deleted from primary storage 110 to free up space on the primary storage device.

Figure 3:
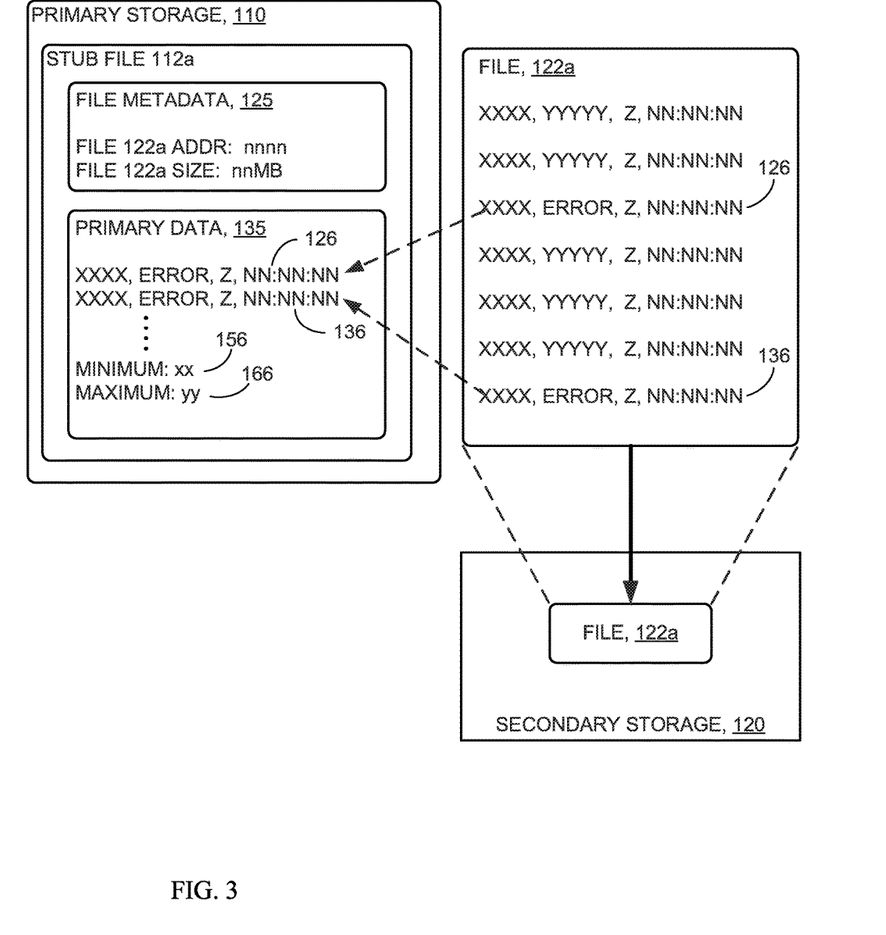
FIG. 3 is a block diagram depicting one example of a data file and a corresponding stub file in accordance with at least one embodiment of the present invention.

FIG. 3 is a block diagram depicting one example of a data file and a corresponding stub file in accordance with at least one embodiment of the present invention. Primary storage 110 includes stub file 112a.

Stub file 112a includes file-related metadata 125 and primary data 135. In some embodiments of the present invention, metadata 125 includes a pointer resolvable to an address, for example an address within secondary storage 120, where corresponding data file 122a is stored. The metadata may also include other file related information such as the file size, timestamps relative to file creation, last access, last modification, etc.

Primary data 135 includes primary data selected from file 122a, for example data determined at operation S220 described above with respect to FIG. 2. In the embodiment of FIG. 3, records 126 and 136 are determined to be primary ("useful") data, and copies of these records are included in primary data 135 of stub file 112a. Primary data further includes metadata that has been determined, based upon data in file 122a, for example statistical information related to the data. For example, metadata record 156 is a minimum value occurring in a given field, among all records of file 122a. Similarly, metadata record 166 is a maximum value occurring in a given field, among all records of the file. Other types of metadata that may be included in primary data 135 include, without limitation: (i) any number of statistical measures of the data, such as standard deviation, average, median, cardinality information, distribution parameters, etc.

Secondary storage 120 includes file 122a. In the embodiment of FIG. 3, secondary storage is a tape library operating as a linear tape file system (LFTS) including: (i) one or more tape cartridges; (ii) one or more tape drives; and/or (iii) at least one tape cartridge transport mechanism designed to deliver a given tape cartridge from its designated physical storage location to a tape drive, and return the cartridge to its storage location. Alternatively, secondary storage could be: (i) an optical storage library; (ii) other mass storage technologies now known or to be developed in the future; and/or (iii) a mix of various storage technologies in any combination.

Figure 4:
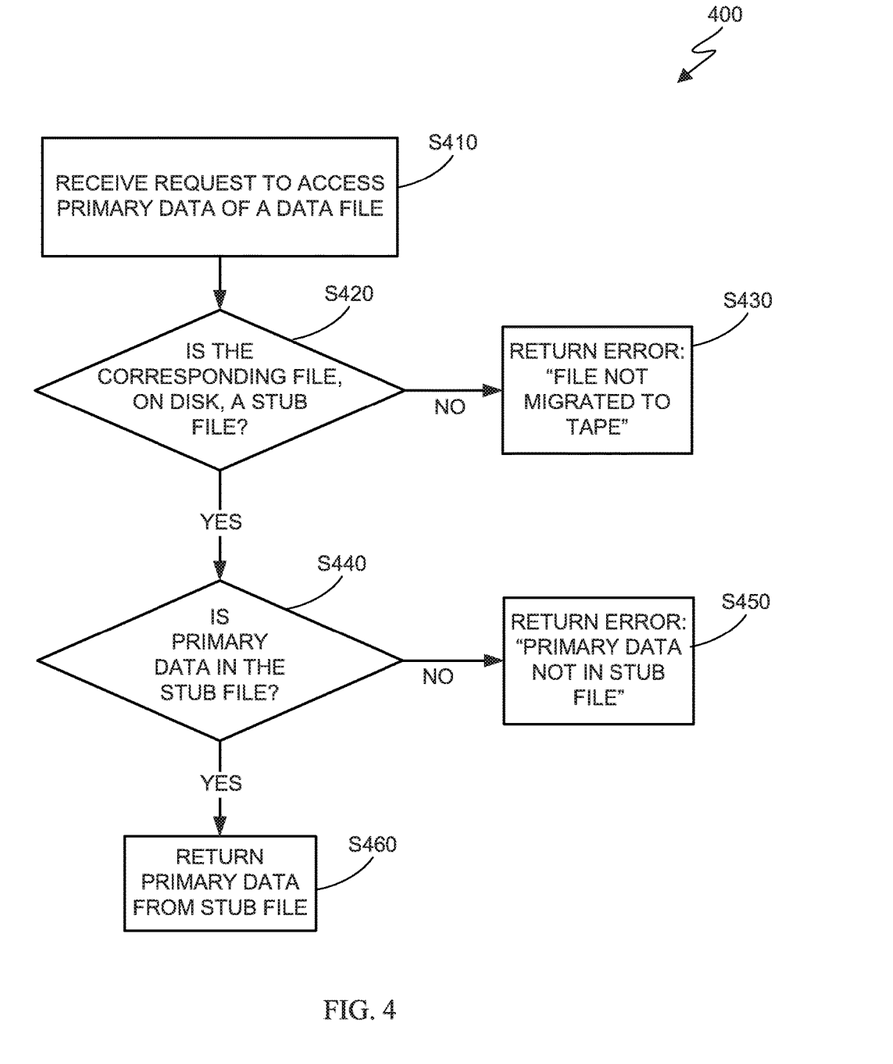
FIG. 4 is a flowchart depicting an example method to recall primary data in in accordance with at least one embodiment of the present invention.

FIG. 4 is a flowchart depicting method 400, to obtain primary data of a target data file, in accordance with at least one embodiment of the present invention. Processing begins at operation S410, where HSM system 140 (see FIG. 1) receives a request to access the target data file, such as file 122a (see FIG. 1), but more particularly, only the primary data of the target data file. In this example embodiment, a copy of the primary data 123a is included in stub file 112a, on primary storage 110, as shown in FIG. 1. In some embodiments, HSM system 140 provides an interface, for example API 146 (see FIG. 1), to applications such as application program 143. The API 146 enables applications to invoke functions in HSM such as functions for retrieving and/or storing primary data 123a. For example, in one embodiment, a primary data read function (named, for example, hsmReadPrimaryData( )) may be invoked by the application program 143 via the API 146. The application calls API 146 and HSM receives the request via the API.

Processing proceeds to decision S420, where HSM 140 determines whether a file, on primary storage, that corresponds to the target data file is: (i) the actual target data file; or (ii) a stub file corresponding to the target data file. If the file on primary storage is not a stub file (meaning the file is the target data file itself), (decision S420, "No" branch), an error message is returned to API 146 (S430). In some embodiments of the present invention, in response to receiving the error message, HSM system 140 opens the target data file from primary storage. Stated another way, API 146 is an interface between an application and HSM. API 146 forwards the error message from HSM to the application. In this case, when an application receives the error message from the API saying the file has not been migrated, the application may decide to read the file from the primary storage.

If the file on the primary storage is a stub file (decision S420, "Yes" branch), processing proceeds at decision S440, where API 146 determines whether primary data of the target data file is included in the stub file corresponding to the target data file. To determine whether the stub file contains primary data of the corresponding data file, API 146 examines a header in the stub file. If the stub file contains primary data of the corresponding data file, the header will include the length of the primary data contained therein. If the primary data is determined not to be contained in the stub file (decision S440, "No" branch), an error message is returned to API 146 (S450). In some embodiments of the present invention, in response to receiving the error message, HSM system 140 recalls the target data file from secondary storage.

If the stub file includes the primary data of the target data file (decision S440, "Yes" branch), processing proceeds to operation S460, where API 146 receives the primary data (from the stub file) via HSM system 140, and forwards the primary data to the requesting user or application.

Figure 5:
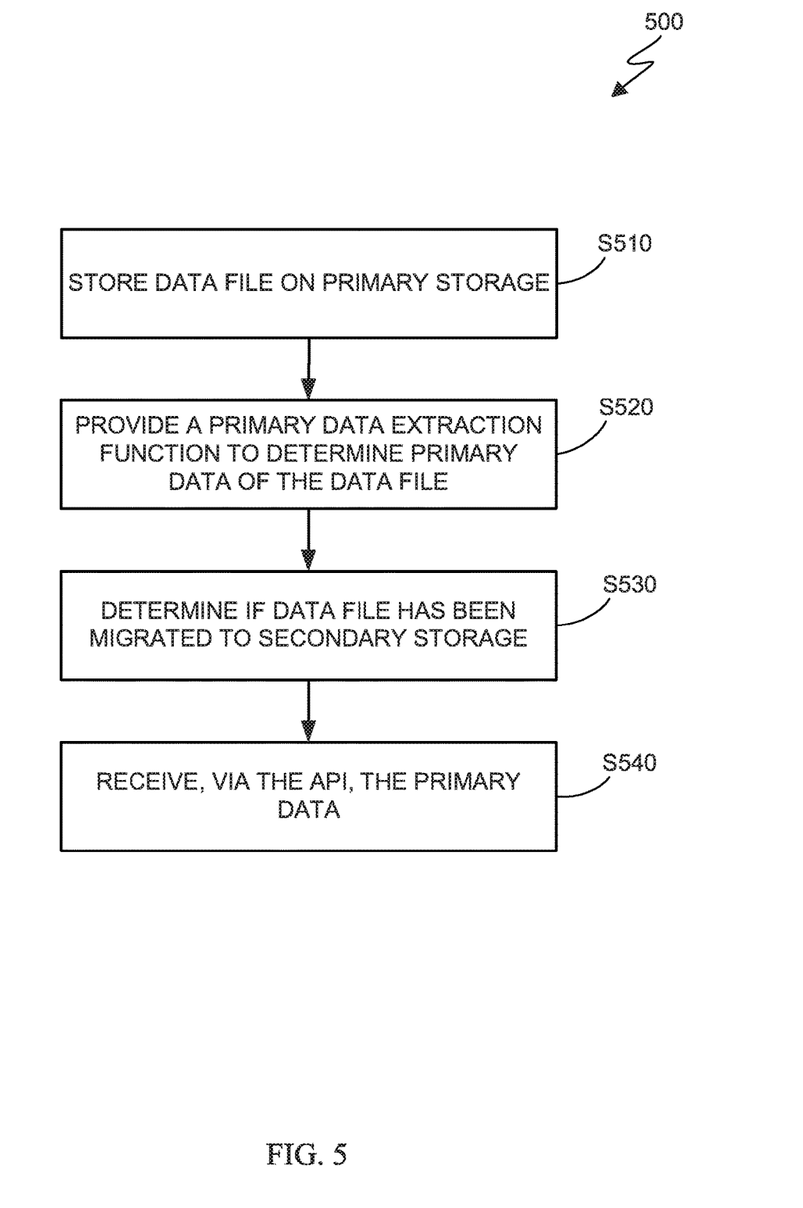
FIG. 5 is a flowchart depicting an example data recall method in in accordance with at least one embodiment of the present invention.

FIG. 5 is a flowchart depicting an example data recall method 500 in accordance with at least one embodiment of the present invention. In this embodiment, a user (or application) (neither user nor application are shown in the Figures) stores (S510) a data file in primary storage, and provides (S520) a determining function to determine which subset of data in the data file is considered to be primary data. The user (or application) subsequently determines (S530), via the API, if the data file has been migrated to secondary storage. If the data file has been migrated to secondary storage, the user (or application) receives (S540) the primary data through the API.

Figure 6:
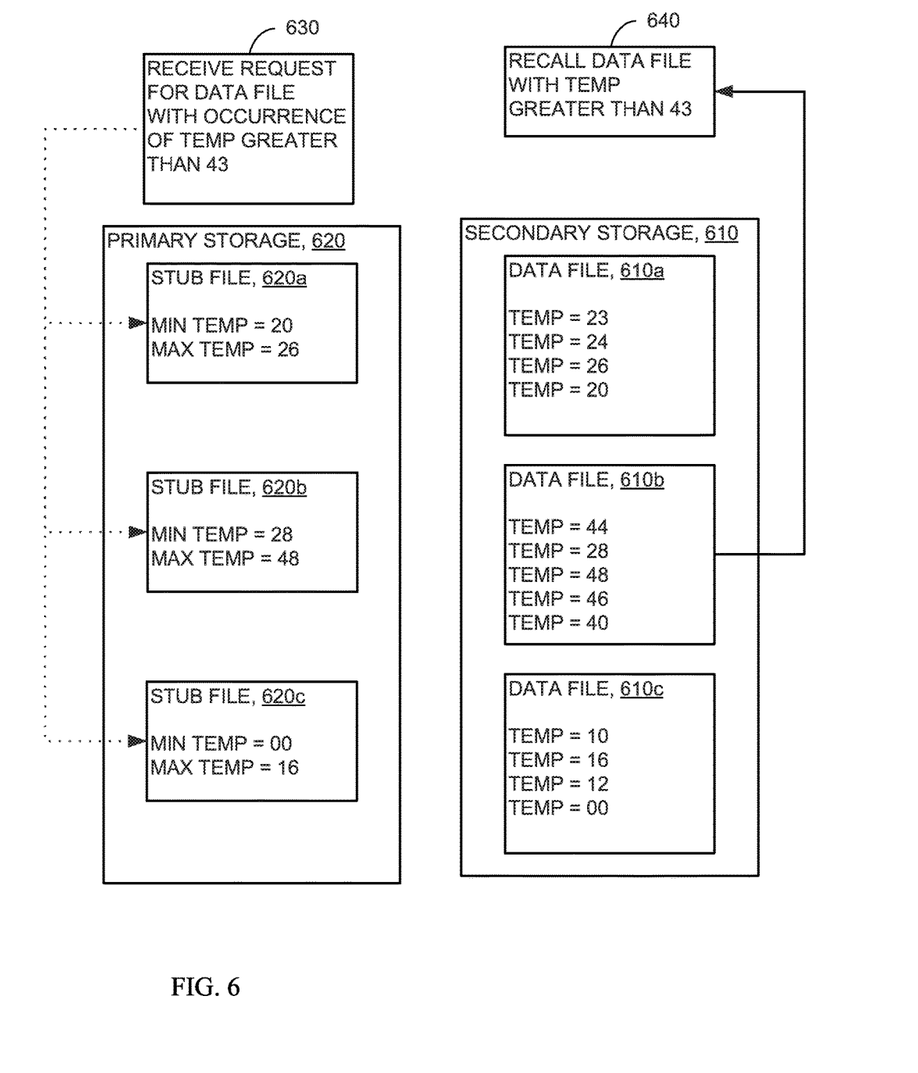
FIG. 6 is a block diagram depicting an example recall method in accordance with at least one embodiment of the present invention.

FIG. 6 is a block diagram depicting an example recall method in accordance with at least one embodiment of the present invention. In this example embodiment, three data files (610a, 610b, and 610c) are resident on secondary storage 610. The data files include temperature sensor data having values as depicted in the Figure. Resident on primary storage 620 are three stub files (620a, 620b, and 620c) respectively corresponding to the three data files (610a, 610b, and 610c). In this embodiment, secondary storage is a tape library mass storage system, and primary storage is a RAID (redundant array of independent disks) magnetic disk storage system. Alternatively, in some embodiments, primary and secondary storage systems may be different types of storage, now known, or to be developed in the future.

Each stub file (on disk) includes metadata information about its corresponding data file (on tape). For example, stub file 620a includes the minimum and maximum temperature information (20, and 26) as recorded in corresponding data file 610*a*. Stub files 620*b* and 620*c* record similar data with respect to their corresponding data files.

In this example embodiment, an analytic application may need to read the sensor data before and after the data has exceeded a certain alarm threshold. Instead of recalling all the sensor data files from tape, the application can first try to retrieve the primary data by calling API 146. The primary data in stub files 620*a* and 620*c* (maximum temperatures 26 and 16 respectively) indicates that the respectively corresponding data files (610*a* and 610*c*) do not include data that exceeds the alarm threshold. The primary data in stub file 620*b* (maximum temperature=48) indicates that at least one temperature record in corresponding data file 610*b* exceeds the alarm threshold. Therefore, in response (640) to the request (630), the application may decide to recall only the file 610*b* from secondary storage. The unnecessary recalls of data files 610*a* and 610*c* are thus avoided.

In some embodiments, a system that, for example, gathers logs from various servers registers a function to select logs that contain "error" text string. Alternatively, an "internet of things" (IoT) system that, for example, periodically gathers sensor data can register a function to perform certain operations including: (i) recording the maximum value and the timestamp within a file; (ii) recording the minimum value and the timestamp within a file; (iii) calculating the average value within a file; and/or (iv) recording irregular values (values that differ from the average value more than a pre-defined threshold, sometimes referred to as outliers). Further, for analytic software or stream processing software that can generate specific metadata based on original data, such software can be registered.

Subsequently, when a user wants to re-read and/or analyze migrated data, the useful data preserved in the stub file on disk can quickly be read, first. Then, the user can determine which file(s) need to be fully read and then trigger a recall of those file(s) from tape. For example, in an IoT system such as discussed above, the user can determine to: (i) recall files whose maximum value exceeds a certain value; and/or (ii) recall files that have more outliers than a given threshold.

Some embodiments of the present invention may include one, or more, of the following features, characteristics and/or advantages: (i) avoids recalls as much as possible; (ii) adds no significant overhead to HSM performance; (iii) can be implemented without requiring additional hardware/systems; and/or (iv) can be implemented by utilizing and extending the existing HSM/file system functions.

Extensions, as provided by some embodiments of the present invention include: (i) new register API; (ii) new stub read API; and (iii) new routine to be executed upon file migration. These extensions are described in the paragraphs below:

(i) New Register API:

A user interface for specifying the functions and the groups of files/directories to which the API is applied.

In some embodiments of the present invention, the migration policy is defined in a structured query language (SQL) type of syntax. Thus, the new API can be integrated into the SQL. For example, MIGRATION_EXEC "path to a script to generate the useful data" WHERE <condition of the files>

In some embodiments, the new API can be a configuration file for HSM (similar to a conventional HTTP server) which has the function and the file/dir name.

Some embodiments, use an API call such as:
registerMigrationCallback <func> <file/dir name>,
in which case, HSM may have an internal table or an internal configuration file, such that when the API is called, the specified function (<func>) and the file/dir names (<file/dir name>) can be stored in the internal table or configuration file.

In some embodiments of the present invention, the function can be a path to an executable program or a script.

(ii) New Stub Read API:

to read the useful data from the stub file.

In some embodiments of the present invention, defines an extended attribute that would trigger the file system to return the useful data in the stub file instead of the actual file data when the file is read.

(iii) New Routine to be Executed Upon File Migration

In some embodiments of the present invention, upon a file migration, if HSM detects that a function is registered for the file, HSM will execute the function to save the generated data in the stub (the system may specify a maximum length for the useful data), and the whole file data is migrated to tape.

In some embodiments of the present invention, a maximum length of the useful data to be stored in the stub can be decided based on a balance between the consumed capacity and the probability of avoiding recalls. Examples of specifying the maximum length of useful data to be stored in the stub include: (i) a static value such as 32 KB; and/or (ii) 10% of the actual file size. If the size of the generated useful data exceeds the defined stub area, it may set a new flag in the extended attribute of the file so that applications can know.

Figure 7:
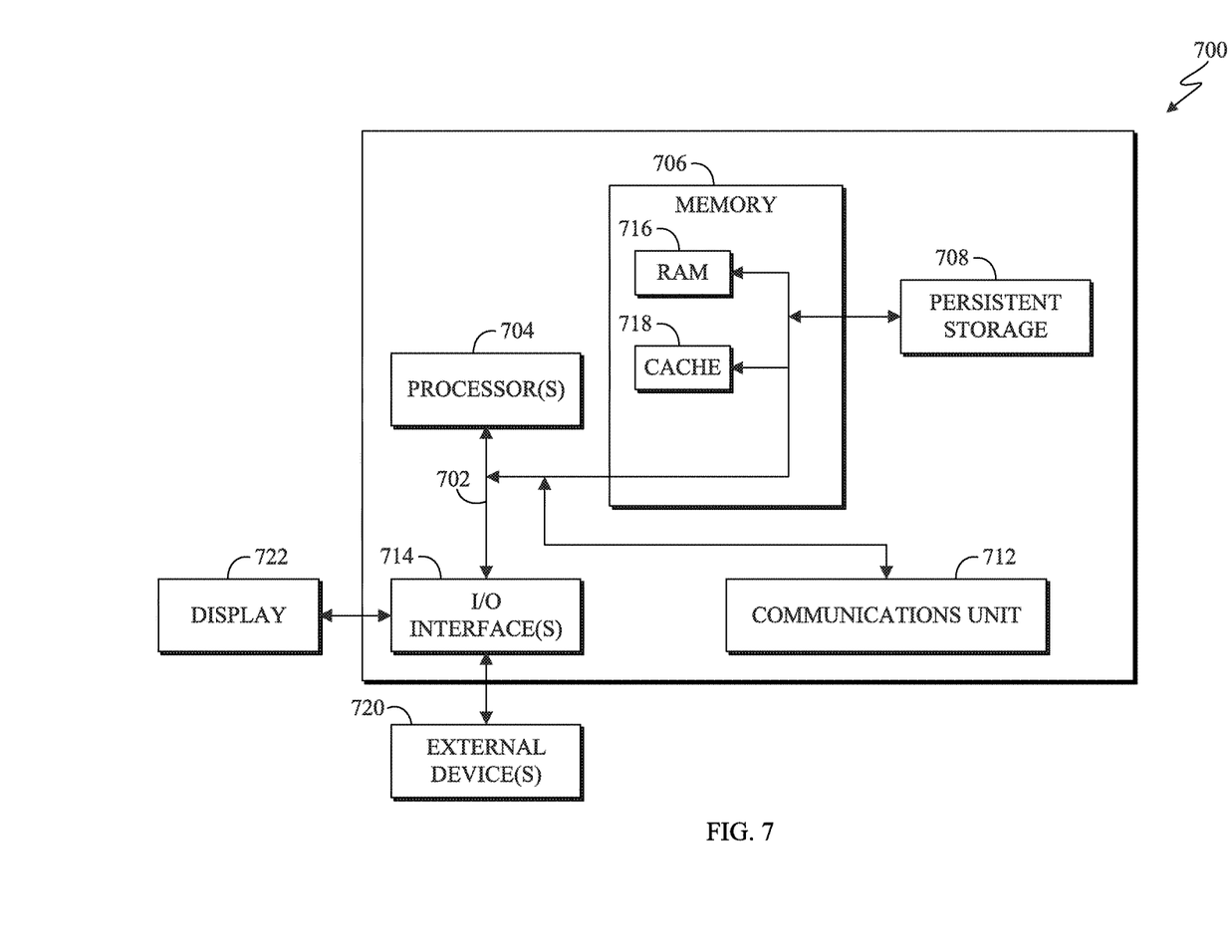
FIG. 7 depicts a block diagram of components of a computer in accordance with some embodiments of the present invention.

FIG. 7 depicts a block diagram of components of a computer in accordance with some embodiments of the present invention. It should be appreciated that FIG. 7 provides only an illustration of one implementation and does not imply any limitations with regard to the environments in which different embodiments may be implemented. Many modifications to the depicted environment may be made.

As depicted, the computer 700 includes communications fabric 702, which provides communications between computer processor(s) 704, memory 706, persistent storage 708, communications unit 712, and input/output (I/O) interface(s) 714. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer-readable storage media. In this embodiment, memory 706 includes random access memory (RAM) 716 and cache memory 718. In general, memory 706 can include any suitable volatile or non-volatile computer-readable storage media.

One or more programs may be stored in persistent storage 708 for access and/or execution by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer-readable storage medium that is also part of persistent storage 708.

Communications unit 712, in these examples, provides for communications with other data processing systems or devices. In these examples, communications unit 712 includes one or more network interface cards. Communications unit 712 may provide communications through the use of either or both physical and wireless communications links.

I/O interface(s) 714 allows for input and output of data with other devices that may be connected to computer 700. For example, I/O interface 714 may provide a connection to external devices 720 such as a keyboard, keypad, a touch screen, and/or some other suitable input device. External devices 720 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 708 via I/O interface(s) 714. I/O interface(s) 714 also connect to a display 722.

Display 722 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to optimal explain the principles of the embodiment, the practical application or technical improvement over technologies found in the marketplace, or to enable others of ordinary skill in the art to understand the embodiments disclosed herein.

What is claimed is:

1. A method for storing data, the method comprising:
   receiving a request to migrate a data file containing a plurality of records from a primary storage device to a secondary storage device;
   determining primary data where the primary data includes a subset of the data file, and the primary data is determined based on rules and criteria set by a user, and further based on a type of data included in the data file;
   inserting the primary data into a stub file; and
   storing the stub file on the primary storage device.

2. The method of claim 1 further comprising:
   migrating the data file to the secondary storage device to produce a migrated data file.

3. The method of claim 1, wherein determining primary data comprises:
   determining that the data file comprises a system log file that includes a plurality of error records including a first error record, where the first error record is preceded by an adjacent first pre-determined number of contiguous preceding records and the first error record is followed by an adjacent second pre-determined number of contiguous following records;
   in response to determining the data file comprises a system log file, designating the combination of the preceding records, the first error record and the following records as primary data.

4. The method of claim 1, wherein determining primary data comprises:
   determining that the data file comprises numerical data;
   in response to determining the data file comprises numerical data, designating primary data as data that is based at least in part on the numerical data and is selected from the group consisting of: a computed result, a selected subset of the numerical data, a minimum value, a maximum value, a mean value, a median value, a standard deviation value, a cardinality value, and a distribution parameter.

5. A method for accessing data, the method comprising:
   determining that:
      a data file has been migrated to secondary storage,
      a stub file, corresponding to the data file, exists on primary storage, and
      the stub file includes primary data, with respect to the data file; and
   in response to the determining, accessing the primary data from the stub file;
   wherein the primary data includes a subset of the data file, and the primary data is determined based on rules and criteria set by a user, and further based on a type of data included in the data file.

* * * * *